(12) United States Patent
Shih et al.

(10) Patent No.: US 9,189,587 B2
(45) Date of Patent: Nov. 17, 2015

(54) CHIP LEVEL CRITICAL POINT ANALYSIS WITH MANUFACTURER SPECIFIC DATA

(71) Applicant: Taiwan Semiconductor Manufacturing Company, Ltd., Hsin-Chu (TW)

(72) Inventors: I-Chang Shih, Zhubei (TW); Jen-Chieh Lo, New Taipei (TW); Tzu-Chin Lin, Hsinchu (TW); Ping-Chieh Wu, New Taipei (TW); Ying-Chou Cheng, Zhubei (TW); Chih-Ming Lai, Hsinchu (TW); Ru-Gun Liu, Zhubei (TW)

(73) Assignee: TAIWAN SEMICONDUCTOR MANUFACTURING COMPANY, LTD., Hsin-Chu (TW)

( * ) Notice: Subject to any disclaimer, the term of this patent is extended or adjusted under 35 U.S.C. 154(b) by 107 days.

(21) Appl. No.: 14/045,242

(22) Filed: Oct. 3, 2013

(65) Prior Publication Data
US 2015/0100927 A1  Apr. 9, 2015

(51) Int. Cl.
*G06F 17/50* (2006.01)
(52) U.S. Cl.
CPC ........ *G06F 17/5081* (2013.01); *G06F 2217/06* (2013.01); *G06F 2217/84* (2013.01)
(58) Field of Classification Search
USPC .......................................................... 716/55
See application file for complete search history.

(56) References Cited

U.S. PATENT DOCUMENTS

| | | | | |
|---|---|---|---|---|
| 5,397,749 A * | 3/1995 | Igarashi | ........................ | 716/113 |
| 6,314,547 B1 * | 11/2001 | Donath et al. | ................ | 716/123 |
| 6,317,859 B1 * | 11/2001 | Papadopoulou | .............. | 716/135 |
| 6,327,686 B1 * | 12/2001 | Grundmann et al. | ......... | 714/738 |
| 6,327,693 B1 * | 12/2001 | Cheng et al. | ................... | 716/119 |
| 8,601,419 B1 * | 12/2013 | Chiang et al. | ................. | 716/112 |
| 8,621,401 B2 * | 12/2013 | Berkens et al. | .................. | 716/54 |
| 8,782,582 B1 * | 7/2014 | Gupta et al. | ................... | 716/106 |
| 2002/0062465 A1 * | 5/2002 | Goto | ............................. | 714/724 |
| 2002/0144219 A1 * | 10/2002 | Zachariah et al. | ................ | 716/4 |
| 2006/0044932 A1 * | 3/2006 | Arp et al. | ....................... | 365/233 |
| 2006/0095877 A1 * | 5/2006 | Su et al. | ............................ | 716/5 |
| 2007/0100586 A1 * | 5/2007 | Cheng et al. | ................... | 702/185 |
| 2009/0125852 A1 * | 5/2009 | Papadopoulou | .................. | 716/4 |
| 2010/0199234 A1 * | 8/2010 | Adya et al. | ........................ | 716/2 |

* cited by examiner

*Primary Examiner* — Suchin Parihar
(74) *Attorney, Agent, or Firm* — Haynes and Boone, LLP

(57) ABSTRACT

A method and computer program are provided for analyzing a set of layers within an integrated circuit design to determine a set of critical points for each layer within the set of layers. The critical points are based at least in part on manufacturer specific process parameters. The method includes assigning a critical point value to each of the critical points within each set of critical points, analyzing a path through the integrated circuit design across multiple integrated circuit design layers, and determining a sum of critical point values of each critical point along the path.

20 Claims, 5 Drawing Sheets

CHIP LEVEL CRITICAL POINT ANALYSIS WITH MANUFACTURER SPECIFIC DATA

BACKGROUND

Integrated circuits may be formed using various photolithographic techniques. Such techniques typically involve exposing a photoresist layer to a light source through a patterned photo-mask. In general, the final pattern formed onto the photoresist layer does not precisely match the designed pattern for which the final pattern was formed. This is caused by various photolithographic process parameters such as the resolution of the light source. It is important to ensure that the final printed pattern is not so far from the designed pattern that functionality of the circuit is adversely affected.

In many cases, the entity that designs a circuit is different from the entity that manufactures the circuit. Because the manufacturing processes, such as the photolithographic processes include parameters that are specific to a particular integrated circuit manufacturer, the manufacturer must analyze each layer of the design separately to ensure that a particular layer does not include circuit features that may cause an issue with the manufacturers photolithographic processes. Various tools exist to perform this check. An example of such a tool is Litho Process Check (LPC) by Cadence Design Systems, Inc. These tools, however, analyze each layer separately and do not factor in effects from other layers Additionally, the circuit designing entity often uses various tools to find critical paths through the circuit. One example of such a tool is On-Chip Critical Path. Such tools allow the circuit designer to determine things like critical paths through the circuit and assist the designer with time delay, cost reduction, trouble shooting, and other issues. Such tools will analyze multiple layers together. However, such tools do not factor in any manufacturer specific photolithographic process parameters. Consequently, it is desired to have a tool that will allow circuit designers or manufacturers to consider both critical path issues from multiple layers as well as manufacturer specific photolithographic process parameters.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the disclosure. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 1:
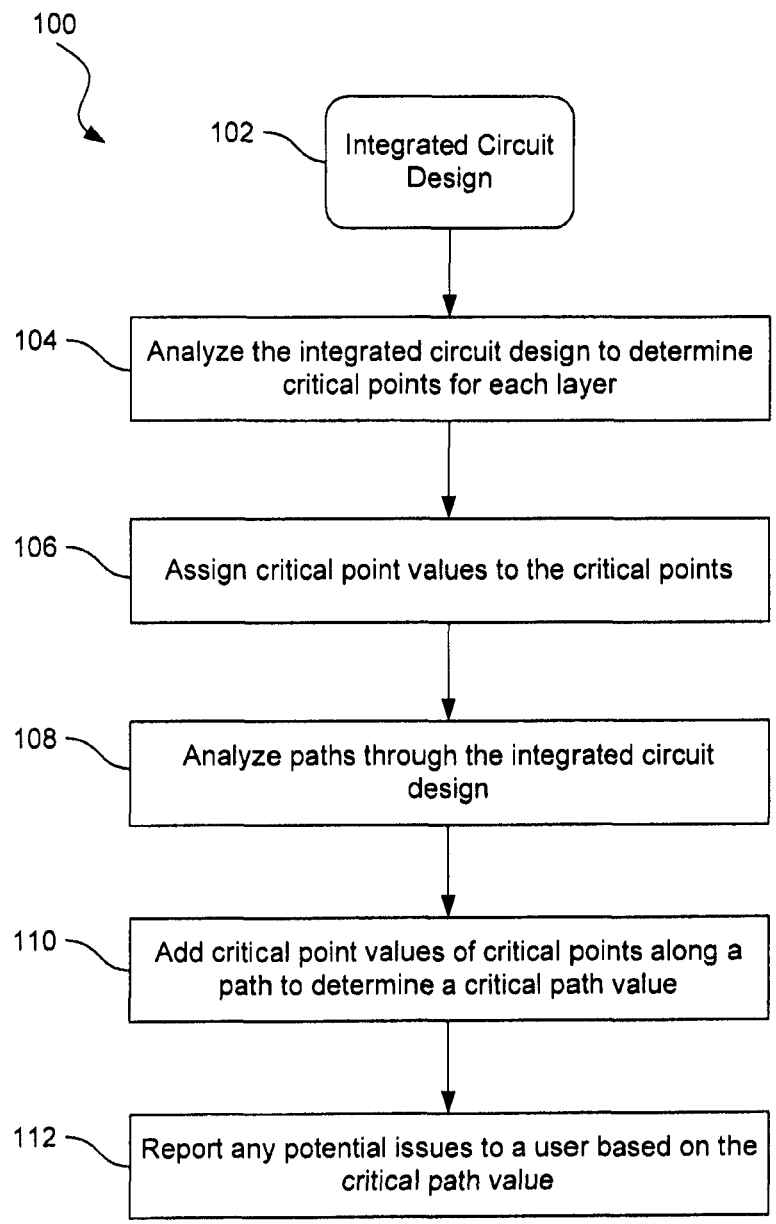
FIG. 1 is a flowchart showing an illustrative method for analyzing multi-layer integrated circuit designs using manufacturer specific data, according to one example of principles described herein.

FIG. 1 is a flowchart showing an illustrative method 100 for analyzing multi-layer integrated circuit designs using manufacturer specific data. According to certain illustrative examples, the method 100 includes various steps performed in relation to an integrated circuit design 102. The integrated circuit design 102 may be made with a variety of circuit design tools. Such tools allow circuit designers to design complex multi-layer integrated circuits and run various tests and simulations on those circuits. As mentioned above, such tools do not include any manufacturer specific data.

The manufacturer specific data includes information related to photolithographic process parameters used by the manufacturer. These parameters can affect how certain circuit patterns are printed onto a substrate. Thus, they can affect the operation of a circuit.

The method 100 begins by analyzing 104 the integrated circuit design to determine critical points for each layer. This process analyzes each specific layer separately. Specifically, the circuit layout is analyzed while taking into consideration the manufacturers photolithographic process parameters. Such parameters include a variety of settings such as the resolution of the light source used to expose a photoresist layer. Other parameters include the type and nature of an etching process.

The method 100 continues by assigning 106 a critical point value to each critical point. A critical point refers to an area of interest that has a potential to cause issues with a printed circuit. For example, a critical point may be a hotspot. A hotspot is a point where there may be an immediate performance issue. Thus, when the circuit is formed, it may not work properly. In a further example, a critical point may include a weak point. A weak point is a portion of the circuit that works when initially formed but may be subject to damage during operation of the circuit. Thus, weak points may cause reliability issues.

A critical point value is a number assigned to a critical point that indicates the severity of that critical point. For example, a critical point value may be assigned on a scale of one to five, with five being the most critical and one being the least critical. Thus, a critical point with a critical point value of four will be of more concern than a critical point with a critical point value of two. The mechanism for assigning the critical point value may be based on the various parameters used by the manufacturer's photolithographic processes.

As mentioned above, various tools can be used to analyze a particular layout for a single layer within an integrated circuit. One example of such a tool is LPC. LPC may be used to analyze circuit features and other manufacturing issues such as Mask Error Enhancement Factor (MEEF), Normalized Image Log Slope (NILS), Image Log Slope (ILS) and Depth of Focus (DoF). The tool may also measure electric based parameters such as RC, effective gate lengths, effective gate widths, and saturation currents. The tool may also apply a Wafer Acceptance Test (WAT).

Such analysis is performed on a layer by layer basis. Thus, each layer is analyzed separately. Nevertheless, the functionality of circuits generally depends not only on issues of a single layer, but issues across multiple layers.

The method 100 continues by analyzing 108 paths through the integrated circuit design. These paths will typically span multiple layers. Each path may run through one or more critical points as determined from the above mentioned processes. Some paths may not pass through any critical points while other paths may pass through several critical points.

The method 100 continues by adding 110 the critical point values of critical points along a given path to determine a total critical path value. For example, a particular path may pass through critical point A and critical point B. Critical point A may have a critical point value of 2 and critical point B may have a critical point value of 3. Thus, the total critical path value for that particular path would be 2+3=5.

The method 100 continues by reporting 112 to a user if there are any issues based on the total critical path value. For example, if the critical point value is above a threshold level, that may be reported to a user. The threshold value may be determined based on the scale used to assign critical point values to the critical points. The threshold value may also be based on past experience related to the number and severity of the critical points along a path that can cause issues. Based on the report, the user then knows to take a closer look at that path and determine if any design adjustments should be made. The following figures and accompanying text provide further details and examples.

Figure 2:
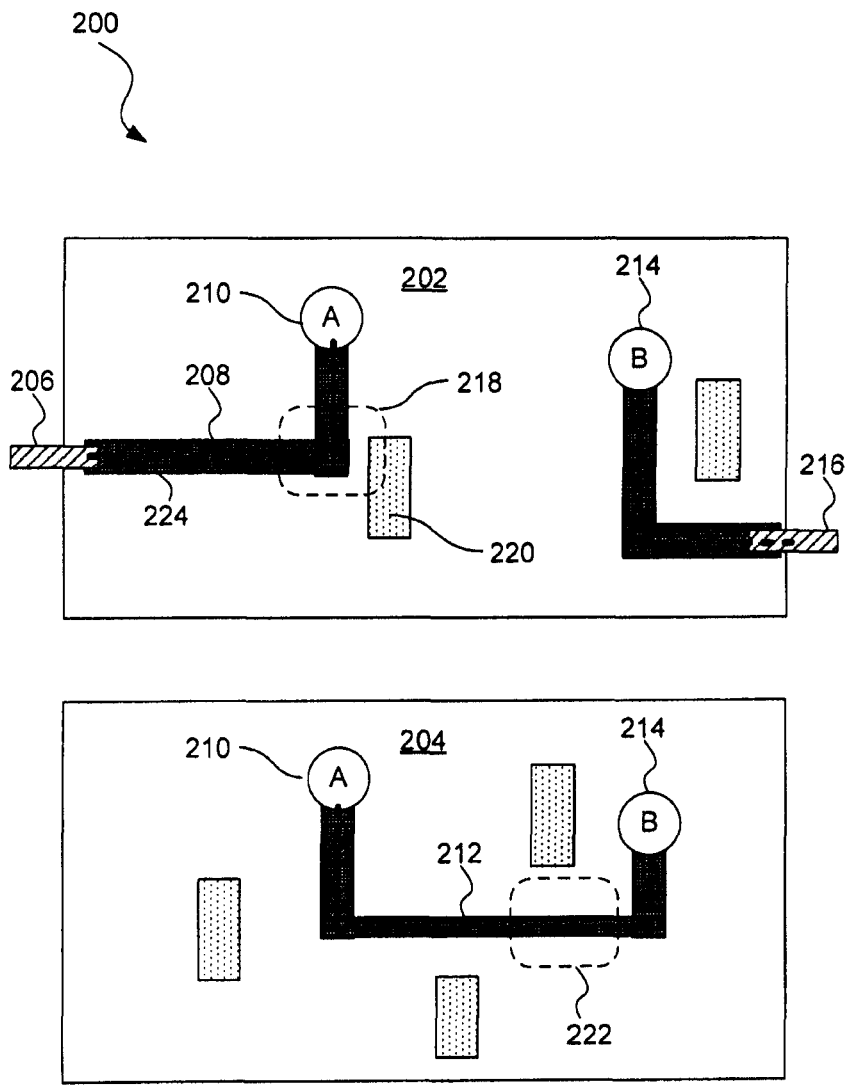
FIG. 2 is a diagram showing an illustrative path through multiple layers of an integrated circuit design, according to one example of principles described herein.

FIG. 2 is a diagram 200 showing an illustrative path 226 through multiple layers 202, 204 of an integrated circuit design. According to certain illustrative examples, the path 226 runs between a first pin 206 and a second pin 216. Both pins are on a first layer 202. The path 226 passes through feature 208 until it hits point A 210. At point A 210, the path moves to a second layer 204. The path 226 then continues along feature 212 until it reaches point B 214. At point B 214, the path moves back up to the first layer 202. From point B 214, the path 226 continues to the second pin 216.

The features through which the path 226 passes may include conductive transmission lines and passive circuit elements such as resistors, capacitors, and inductors (not shown). Additionally, the path 226 may pass through switching components such as transistors (not shown). The path 226 may cross layers by passing through vias formed between the layers 202, 204.

In the present example, the path 226 passes through two critical points 218, 222. The first critical point 218 is on the first layer 202 and the second critical point 222 is on the second layer 204. Critical points may result from a variety of situations. In one example, a critical point may be the result of bridging. The first critical point 218 is relatively close to another feature 220. In some cases, various photolithographic processes may unintentionally provide a small electrical connection between the two features. Such a connection may cause functionality issues.

In a further example, a critical point may be the result of necking. The second critical point 222 is along a narrower feature 212. Thus, certain photolithographic processes may unintentionally make portions of the feature 212 too narrow. This may also potentially cause functionality issues.

As mentioned above, each of the critical points is assigned a critical point value. In one example, when the analysis is performed on the first layer 202, the first critical point 218 may be assigned a value of 2. When the analysis is performed on the second layer 204, the second critical point 222 may be assigned a value of 3. Thus, the total sum of critical point values along the path is 5. It may be, for example, that the threshold value is 4. In such a case, this path would be reported to a user as having potential issues. By using the sum of critical point values along a particular path, which spans multiple layers, a user has a chip level analysis tool that includes both manufacturer data and factors in issues across multiple layers.

Critical points may be based on a variety of different processes and parameters. For example, a critical point may be based on any electrical, optical or environmental parameters. The examples provided herein are not an exhaustive list of all possible process parameters that may be used in accordance with principles described herein.

Using the sum of critical points, a designer may make adjustments, if desired, to the circuit design. Such adjustments may reduce the sum of critical point values. The manufacturer may then take the adjusted design and tape it out to a mask. The integrated circuit manufacturing process can then begin.

In some cases, multiple paths may pass through a particular critical point. According to certain illustrative examples, the process for analyzing a circuit may begin by selecting a point within the integrated circuit design. The selected point may or may not correspond with a critical point. Then, it is determined if there are any paths through the selected point. For each path through the selected point, the critical point value for each critical point along that path is added to find the critical path value for that path. The analysis may continue by selecting a new point along any of the paths analyzed and finding any new paths through that point. Critical path values are then determined for each new path. This process may be repeated until every path through the integrated circuit design has been analyzed.

Figure 3:
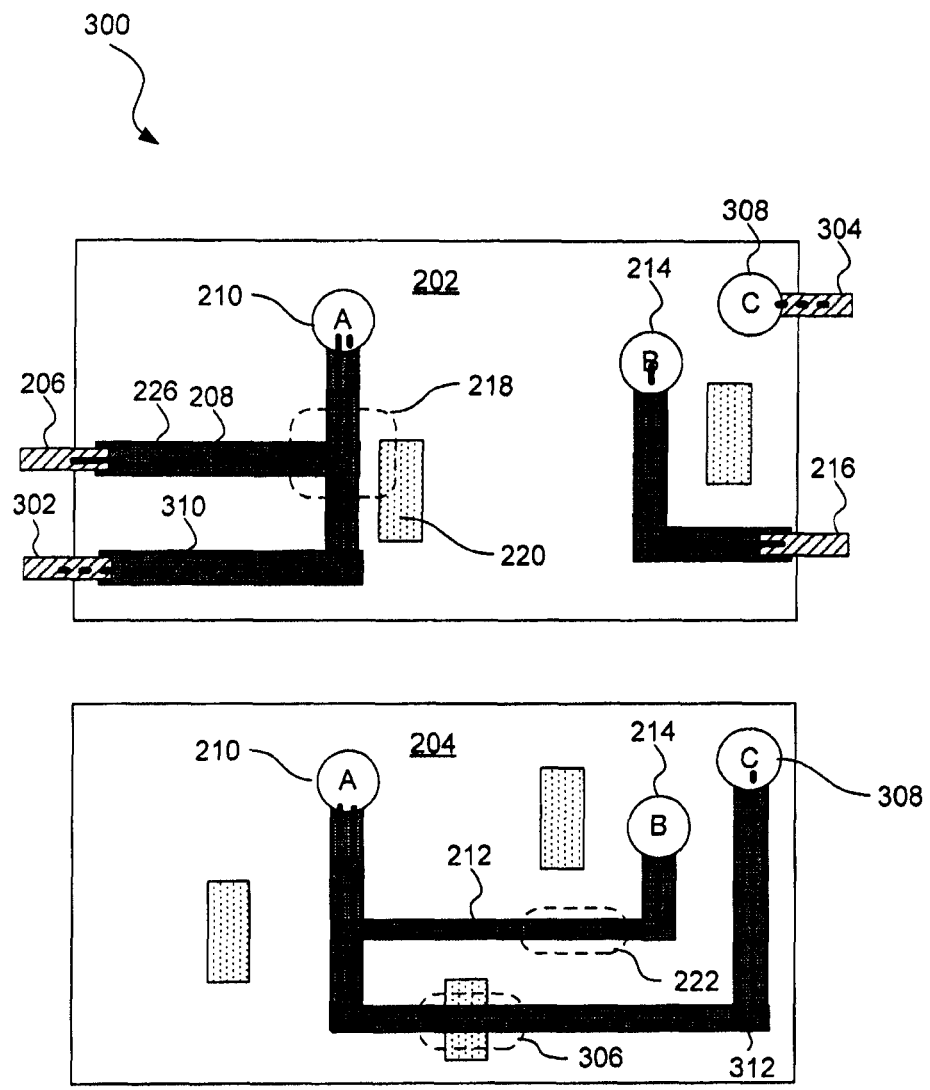
FIG. 3 is a diagram showing illustrative paths through multiple layers of an integrated circuit design, according to one example of principles described herein.

FIG. 3 is a diagram showing illustrative paths through multiple layers of an integrated circuit design. According to the present example, a second path 310 passes through the circuit in addition to the first path 226. The second path 310 runs from a third pin 302 to a fourth pin 304. The second path 310 passes from the first layer 202 to the second layer 204 at point A 210. The second path 310 then passes back to the first layer 202 at point C 308. The second path 310 passes through a the first critical point 218 and a third critical point 306, but does not pass through the second critical point 222.

In one example, the first critical point 218 is assigned a critical point value of 2, the second critical point is assigned a critical point value of 1, and the third critical point is assigned a critical point value of 4. Additionally, the threshold value may be 5. Thus, the critical path value of the first path 226 is 3, which is below the threshold value. In contrast, the critical path value of the second path 310 is 6, which is above the threshold. When considering the first layer 202 alone, there is no issue with the single critical point 218. However, when considering paths that run through other layers, the total amount of critical points may cause issues. Thus, by using methods embodying principles described herein, designers may be better able to detect potential issues.

According to certain illustrative examples, critical point values can be weighted based on the position of the corresponding critical point. Specifically, a critical point value may be weighted based on the layer on which it is placed. For example, when considering a specific point on a first layer, the critical points on the adjacent layers may be weighted more heavily than critical points on layers that are further away.

Additionally or alternatively, a critical point may be weighted based on how far it is from a particular location 312. For example, considering a particular location 312, the third critical point 306 is closer than the first critical point 218. Thus, the third critical point may be weighted more. Furthermore, assuming that there were more critical points on the second layer 204 along the second path 310, they may each be weighted differently when considering how far they are from the considered position 312.

Various formulas may be used to determine how to weight different critical points. In one example, the weighting may be defined by 1/d where d is the distance from the considered point 312. The weighting mechanism may be designed to work with the scale used to assign critical point values to the critical points.

Figure 4:
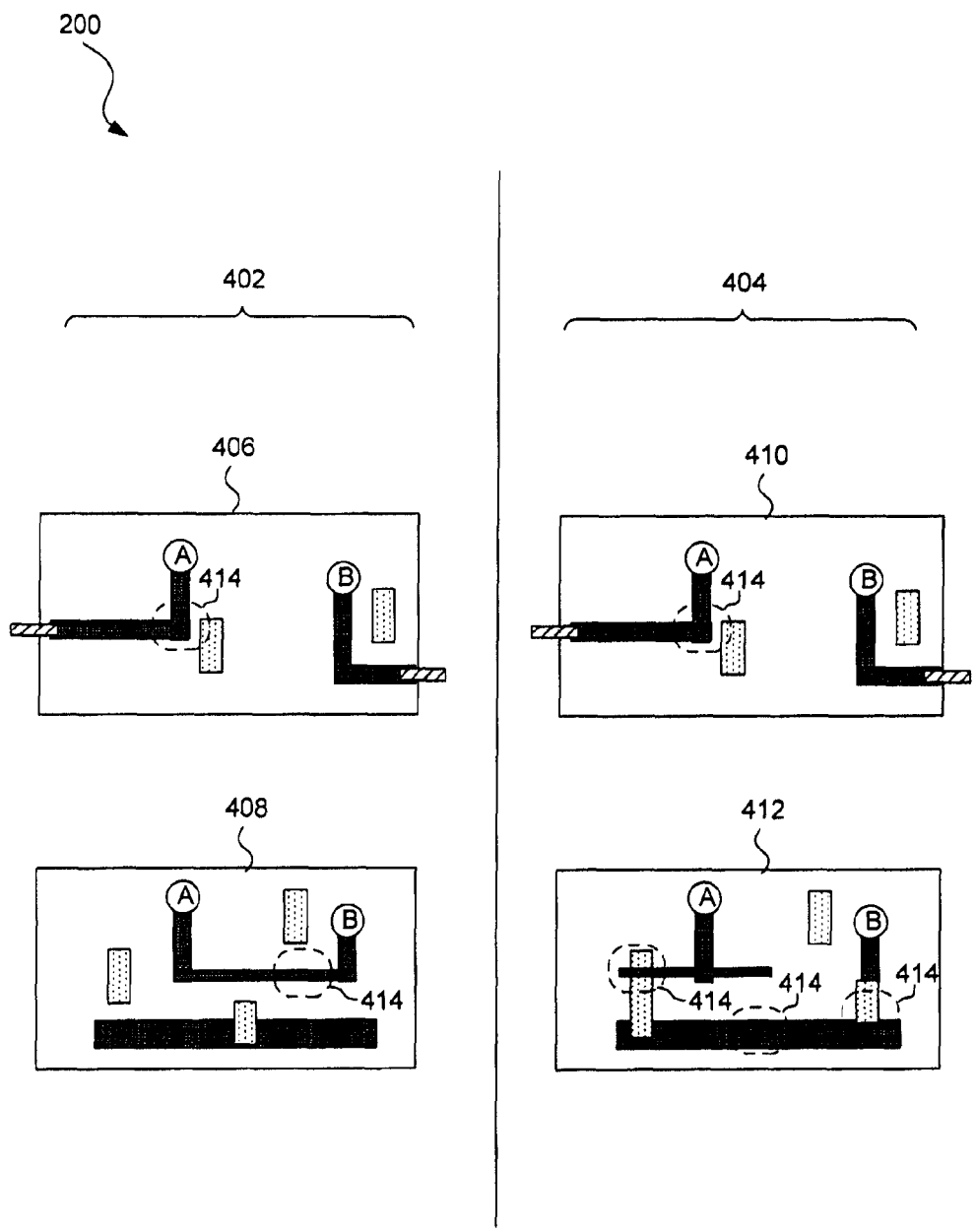
FIG. 4 is a diagram comparing different multi-layer circuit designs, according to one example of principles described herein.

FIG. 4 is a diagram comparing different multi-layer circuit designs. According to the present example, the layers 406, 408 shown on the left relate to a first scenario 402 and the layers 410, 412 on the right relate to a second scenario 404. FIG. 4 illustrates how the same first layer 406 can behave differently based on different second layers 408, 412. Layer 406 is the same as layer 410 and layer 408 is different from layer 412.

In the present example, a path running through layer 406 and layer 408 passes through only two critical points 414. Alternatively, a path running through layer 410 and layer 412 passes through a total of four critical points 414. Thus, examining layer 406 alone does not provide the entire picture for design purposes. Rather, examining layer 1 alone using process tools such as LPC allows the manufacturer to fix issues with that layer alone. However, it can be advantageous to consider the effects of adjacent layers.

Figure 5:
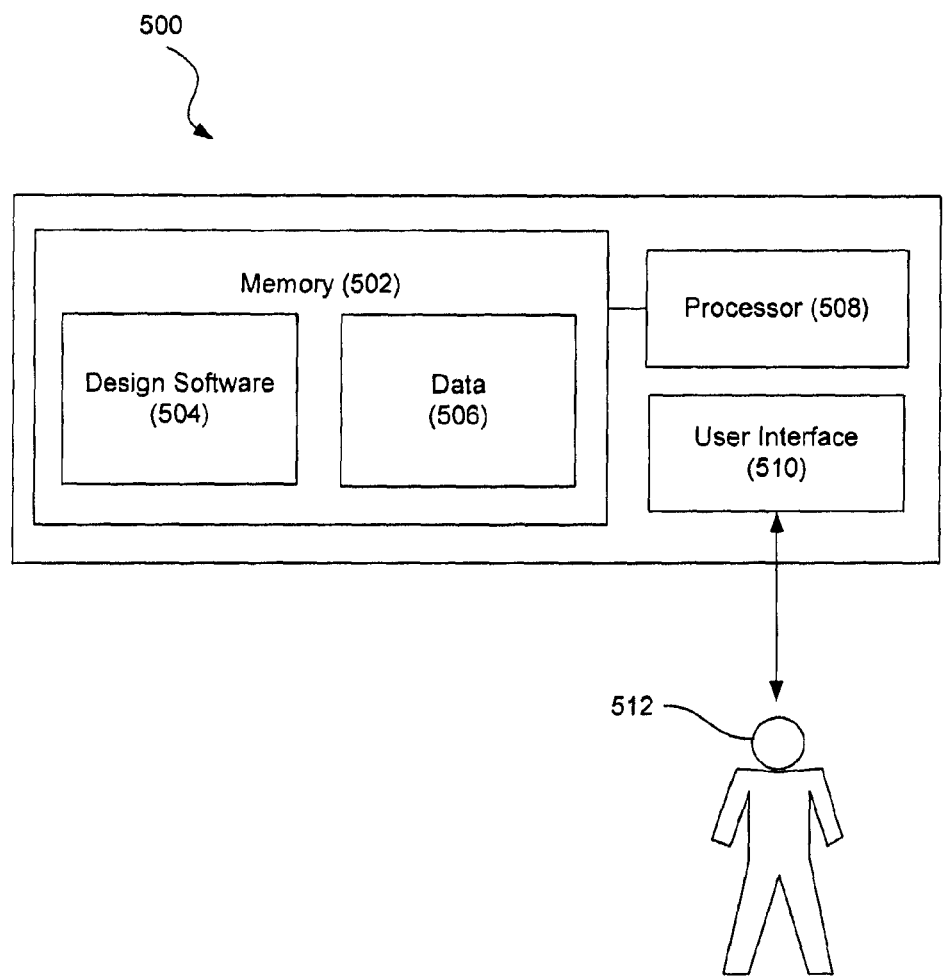
FIG. 5 is a diagram showing an illustrative computer processing system for analyzing multi-layer integrated circuit designs using manufacturer specific data, according to one example of principles described herein.

FIG. 5 is a diagram showing an illustrative computer processing system for analyzing multi-layer integrated circuit designs using manufacturer specific data, according to one example of principles described herein. According to certain illustrative examples, the physical computing system 500 includes a memory 502 having layout software 504 and data 506 stored thereon. The physical computing system 500 also includes a processor 508 and a user interface 510.

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software 504 and data 506.

The physical computing system 500 also includes a processor 508 for executing the software 504 and using or updating the data 506 stored in memory 502. In addition to storing the layout software 504, the memory 502 may store an operating system. An operating system allows other applications to interact properly with the hardware of the physical computing system.

The design software 504 may include the tools to design an integrated circuit pattern. The design software 504 may also include the tools to analyze the critical points for each layer using manufacturer specific parameters. Additionally, the design software 504 may include tools to analyze the various paths running across multiple players and consider the critical point values assigned to the critical points.

A user interface 510 may provide a means for a user 512 to interact with the system. The user 512 may use various tools such as a keyboard or a mouse to input information into the physical computing system. Additionally, various output devices such as a monitor may be used to provide information to the user 512. As mentioned above, the software may be designed to report any issues to a user 512. Such issues include critical path values that are higher than defined threshold values.

According to certain illustrative examples, a method performed by a computer processing system includes analyzing a set of layers within an integrated circuit design to determine a set of critical points for each layer within the set of layers, the critical points being based at least in part on manufacturer specific process parameters, assigning a critical point value to each of the critical points within each set of critical points, analyzing a path through the integrated circuit design across multiple integrated circuit design layers, and determining a sum of critical point values of each critical point along the path.

According to certain illustrative examples, a method performed by a computer processing system includes receiving an integrated circuit design; analyzing a set of layers within the integrated circuit design to determine a set of critical points for each layer within the set of layers, the critical points being based at least in part on manufacturer specific process parameters, assigning a critical point value to each of the critical points within each set of critical points, selecting a first point within the integrated circuit design, selecting a first path that passes through the first point, and summing critical point values for each critical point along the first path to determine a first critical path value.

A computer processing system includes a processor and a memory. The memory includes computer readable instructions that when executed by the processor, cause the processor to analyze a set of layers within an integrated circuit design to determine a set of critical points for each layer within the set of layers, the critical points being based in part on manufacturer specific process parameters, assign a critical point value to each of the critical points within each set of critical points, analyze a path through the integrated circuit design across multiple integrated circuit design layers, determine a sum of critical point values of each critical point along the path, and report to a user if the sum is greater than a threshold value.

It is understood that various different combinations of the above-listed embodiments and steps can be used in various sequences or in parallel, and there is no particular step that is critical or required. Additionally, although the term "electrode" is used herein, it will be recognized that the term includes the concept of an "electrode contact." Furthermore, features illustrated and discussed above with respect to some embodiments can be combined with features illustrated and discussed above with respect to other embodiments. Accordingly, all such modifications are intended to be included within the scope of this invention.

The foregoing has outlined features of several embodiments. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. A method performed by a computer processing system, the method comprising:
   analyzing a set of layers within an integrated circuit design to determine a set of critical points for each layer within the set of layers, the critical points being based at least in part on manufacturer specific process parameters;
   assigning a critical point value to each of the critical points, wherein the critical point value is weighted based on a distance from the critical point to a common point in the integrated circuit design;
   analyzing a path through the integrated circuit design across multiple integrated circuit design layers; and
   determining a sum of critical point values of each critical point along the path.

2. The method of claim 1, further comprising, reporting a potential issue to a user if the sum of critical point values is greater than a threshold value.

3. The method of claim 2, wherein the threshold values are determined based on criteria for determining the critical point values.

4. The method of claim 1, wherein the path runs through a specified point within the integrated circuit design.

5. The method of claim 4, further comprising, analyzing additional paths of the integrated circuit design that pass through the specified point and determining a sum of critical point values assigned to critical points along the additional paths.

6. The method of claim 1, wherein the critical points include at least one of:
   a hotspot that may cause an immediate performance issue; and
   a weak point that may cause reliability issues.

7. The method of claim 1, wherein the critical points are a result of either necking or bridging.

8. The method of claim 1, wherein critical point values are weighted differently based on where a corresponding critical point is positioned within the integrated circuit design.

9. The method of claim 8, wherein the weighting of a particular critical point is based on at least one of:
   a layer on which the critical point is placed; and
   a distance between a specified point on the integrated circuit design and the critical point.

10. The method of claim 1, further comprising:
    adjusting a design based on the sum of critical point values; and
    taping out the design to a mask.

11. A method performed by a computer processing system, the method comprising:
    receiving an integrated circuit design;
    analyzing a set of layers within the integrated circuit design to determine a set of critical points for each layer within the set of layers, the critical points being based at least in part on manufacturer specific process parameters;
    assigning a critical point value to each of the critical points, wherein the critical point value is weighted based on a distance from the critical point to a common point in the integrated circuit design;
    selecting a first point within the integrated circuit design;
    selecting a first path that passes through the first point; and
    summing critical point values for each critical point along the first path to determine a first critical path value.

12. The method of claim 11, further comprising, selecting a second point along the first path.

13. The method of claim 12, further comprising, selecting a second path that runs through the second point.

14. The method of claim 13, further comprising, summing critical point values for each critical point along the second path to determine a critical path value.

15. The method of claim 14, further comprising, repetitively selecting new critical points along new paths until each path within the integrated circuit design has been analyzed and assigned a critical path value.

16. The method of claim 11, further comprising, reporting to a user if the critical path value is greater than a threshold value.

17. The method of claim 11, wherein the critical points include at least one of: a hotspot and a weak point.

18. The method of claim 1, wherein critical points are weighted differently.

19. The method of claim 18, wherein the weighting of a particular critical point is based on at least one of:
    a layer on which the critical point is placed; and
    a distance between a specified point on the integrated circuit design and the critical point.

20. A computer processing system comprising:
    a processor; and
    a memory comprising computer readable instructions that when executed by the processor, cause the processor to:
    analyze a set of layers within an integrated circuit design to determine a set of critical points for each layer within the set of layers, the critical points being based in part on manufacturer specific process parameters;
    assign a critical point value to each of the critical points, wherein the critical point value is weighted based on a distance from the critical point to a common point in the integrated circuit design;
    analyze a path through the integrated circuit design across multiple integrated circuit design layers;
    determine a sum of critical point values of each critical point along the path; and
    report to a user if the sum is greater than a threshold value.

* * * * *